F. H. STANWOOD.
STEP TREAD.
APPLICATION FILED MAY 3, 1917.
1,436,414.
Patented Nov. 21, 1922.
2 SHEETS—SHEET 2.
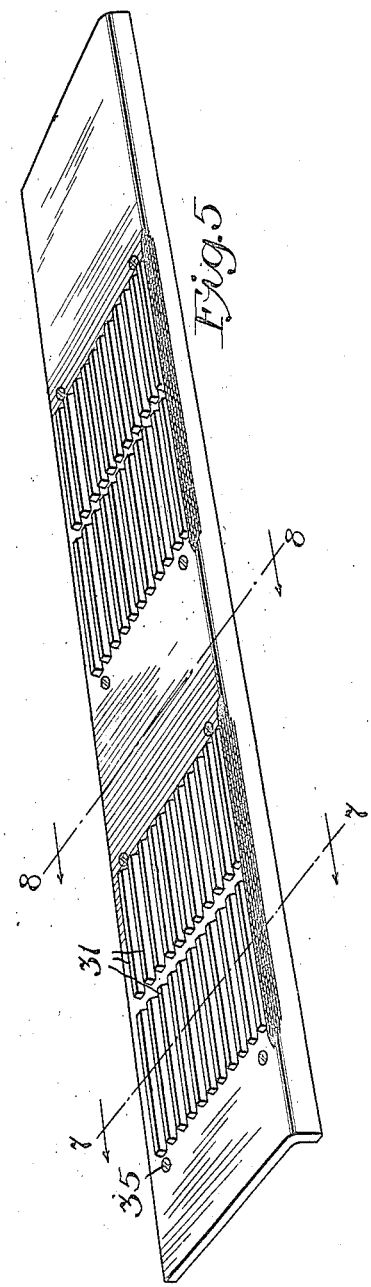
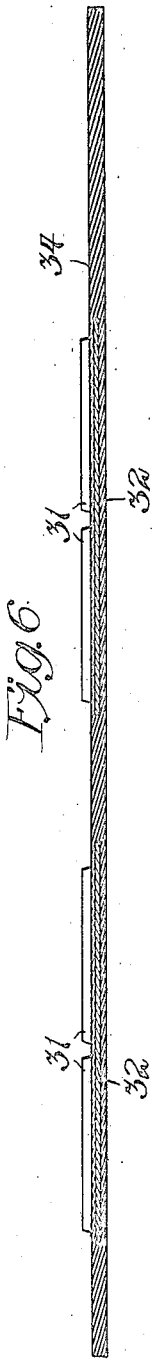
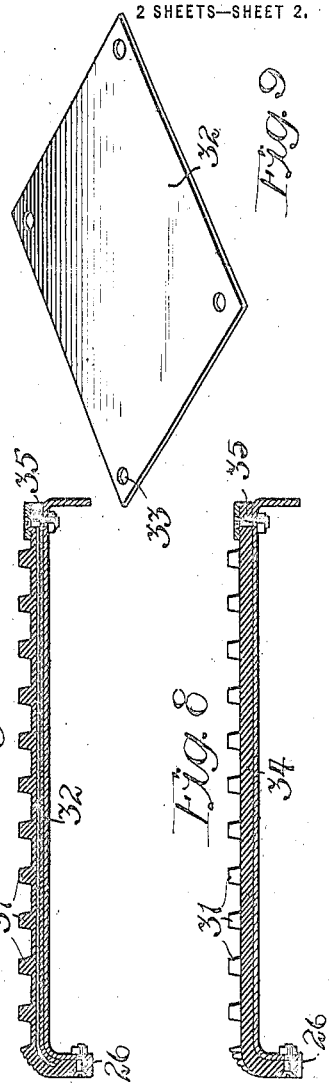

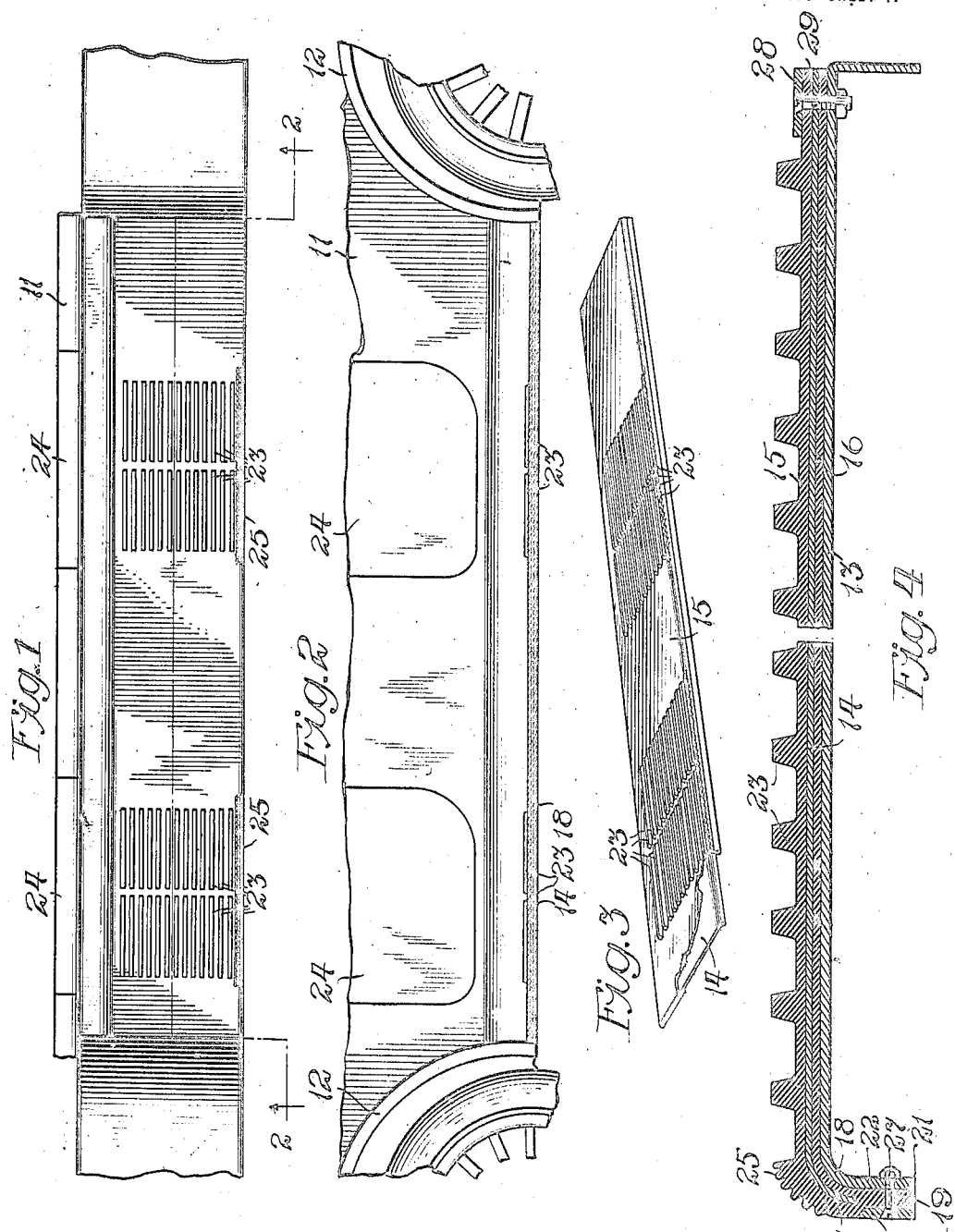

Patented Nov. 21, 1922.

1,436,414

UNITED STATES PATENT OFFICE.

FRANK H. STANWOOD, OF CHICAGO, ILLINOIS, ASSIGNOR TO STANWOOD EQUIPMENT COMPANY, OF BOSTON, MASSACHUSETTS, A CORPORATION OF MAINE.

STEP TREAD.

Application filed May 3, 1917. Serial No. 166,258.

*To all whom it may concern:*

Be it known that I, FRANK H. STANWOOD, a citizen of the United States, residing in Chicago, in the county of Cook and State of Illinois, have invented a new and useful Improvement in Step Treads, of which the following is a specification.

This invention relates in general to step treads and has more particular reference to steptreads adapted for use on automobile running boards and the like.

A principal object of the invention is the provision of a step tread for this and other uses which will cover substantially the entire surface of the running board and which will be adapted to prevent slipping of the foot of a person entering a car and adapted also to clean a large part of the mud and dirt from the shoe.

A further object of the invention is the provision of a step tread possessing these and other important advantages which will be of pleasing appearance, adding materially to the general appearance of the automobile provided therewith.

A further object of the invention is the provision of such a step tread which will be of enduring efficiency and which may be cheaply manufactured and readily installed both at the factory when the car is constructed and by the user to replace other step treads and to be positioned upon the ordinary running board of the car already in use.

Other objects and advantages of the invention will be apparent as it is better understood from the following description which, when considered in connection with the accompanying drawing, illustrates preferred embodiments thereof.

Referring to the drawing,

Figure 1 illustrates a top plan view of a step tread embodying my invention and showing the same positioned upon the running board of an automobile;

Fig. 2 is a partial side elevation of the same, the step tread and running board being shown in section;

Fig. 3 is a perspective view of the step tread with the parts broken away to disclose further details of the construction;

Fig. 4 is an enlarged transverse sectional view of the same in place upon the running board of a car;

Fig. 5 is a perspective view of a second embodiment of my present invention;

Fig. 6 is a longitudinal sectional view of the same;

Fig. 7 is a section taken substantially on the lines 7—7 of Fig. 5;

Fig. 8 is a section taken substantially on the line 8—8 of Fig. 5; and

Fig. 9 is a perspective view of one of the reinforcing plates provided in the step tread shown in Figure 5.

For the purpose of illustrating my present invention I have shown on the drawing a part of an automobile on which reference character 11 designates the body; reference characters 12 the mud guards or fenders and reference character 13 the step or running board proper.

In both of the embodiments of the invention shown the step tread is adapted to fill the space between the fenders to completely cover the surface of the step or running board. In the embodiment of the invention shown in Figs. 1 to 4 the step tread comprises a body of rubber or other soft material in which is embedded a reinforcing sheet 14. The rubber or composition is disposed in a sheet 15 above the reinforcing plate 14 and a sheet 16 beneath it.

In the present instance the sheet 14 extends throughout the length of the tread and is substantially co-extensive with the outer upper surface of the running board. At the front edge the sheet 14 is bent down to provide a rounded nosing 17 terminating just beneath the curved nosing 18 of the forward edge of the running board. The rubber or composition sheets 15 and 16 are extended beyond and beneath this forward edge of the reinforcing plate 14 and terminate in a body 19 at the extremity 21 of the part 22 of the running board forming the outer vertical part as may be seen in Fig. 4.

A plurality of ribs 23 arranged in series and extending longitudinally of the running board are provided in front of each door 24. These ribs are shown to be arranged in the present instance in two series extending from outside to inside of the running board. At the outer edge the series terminates in a raised serrated nosing 25. A plate 26 adapted to be embedded in the rubber body 19 and to be secured to the vertical part 22 of the running board by bolts 27 is provided to hold the forward or outer edge of the step tread in place. The inner edge is held in place by a similar plate 28 disposed upon the upper face of the tread and secured by bolts 29 taking through the two sheets 15 and 16 through the reinforce 14 and through the body 13 of the running board. The rubber sheets are preferably vulcanized to the plate 14 and where the step tread is positioned at the automobile factory, if desired, the tread may be vulcanized also to the running board itself.

Referring now to Figs. 5 to 9 inclusive, it will be noted that this embodiment of the invention differs only from the one already described in that partial reinforcements only are used. Manifestly the greatest wear occurs upon the part of the step tread located immediately in front of the door and beneath the ribs generally indicated at 31. The reasons for this greater wear at these points are believed to be first because these parts of the running board are subject to greatest use and second because the action of the ribs in cleaning the feet causes more severe strains in the material. In this form of the invention two reinforcing plates 32, each preterably having a number of holes 33 through it are embedded in the rubber body 34 beneath the area covered by the ribs. The remainder of the step tread consisting merely of the body of rubber or other suitable composition. Similar fastening devices 35 and 36 are provided and the tread has the appearance, generally speaking, of the tread first described.

It will be manifest that the invention in either form can be readily applied, cheaply manufactured and that it will be of comfortable and convenient use.

It is thought that the invention and many of its attendant advantages will be understood from the foregoing without further description and it will be obvious that various changes can be made in the form, construction and arrangements of the parts without departing from the spirit and scope of the invention, the forms hereinbefore described being merely preferred embodiments thereof.

I claim:

1. A step tread for an automobile or the like, comprising a covering for substantially the entire upper surface of the running board, said covering consisting of a rubber mat having upwardly projecting yieldable ribs falling before the automobile doors and having a metal reinforcing member incorporated therein beneath said ribs.

2. A step tread for an automobile or the like, comprising a covering for substantially the entire upper surface and edge of the running board, said covering consisting of a sheet of plastic material provided with upstanding flexible ribs falling before the automobile doors and having a thickened nosing extending over the edge of the running board beyond said ribs.

3. A step tread for an automobile or the like, comprising a plastic body adapted to cover substantially the entire area of the running board and having upstanding ribs in circumscribed areas only of said body, and a rigid reinforcing member in said body beneath said ribs.

4. A step tread for an automobile or the like, comprising a body of soft material extending over substantially the entire surface of the running board, said body having upstanding ribs arranged in groups extending from front to back before the automobile doors and a serrated nosing beyond said ribs and at the edge of the running board, and a metal reinforcing member incorporated in said body and having an outer downwardly turned edge extending along the edge of the running board.

5. A running board for automobiles, comprising a main support, and a covering for the upper surface and edge of said support constituting a body of plastic material provided with upstanding yieldable ribs in circumscribed areas before the automobile doors, said body having rigid reinforcing members incorporated therein beneath said ribs and being secured to the upper surface and edge of the running board to provide a complete and uniform protection therefor.

6. A running board for automobiles, comprising a main support, and a covering for the upper surface and edge of said support constituting a body of plastic material provided with upstanding yieldable ribs in circumscribed areas before the automobile doors, said body having rigid reinforcing members incorporated therein beneath said ribs and being secured to the upper surface and edge of the running board to provide a complete and uniform protection therefor, said covering having a down-turned stiffened outer edge causing it to fit evenly and closely along the running board edge.

7. A step tread for an automobile or the like, comprising a rubber covering for substantially the entire surface of the running board, said covering being provided in limited areas before the automobile doors with longitudinally extending isolated ribs and a thickened serrated nosing at the edge of the running board adjacent said ribs, and rigid reinforcing means completely encased in said covering beneath said ribs and being downwardly turned at the outer edge to support said nosing and to cause the covering to conform to the edge of the running board.

Signed in the presence of two subscribing witnesses.

FRANK H. STANWOOD.

Witnesses:
  J. C. CARPENTER,
  M. EDNA BARRY.